United States Patent [19]

Chapman

[11] Patent Number: 5,290,074
[45] Date of Patent: Mar. 1, 1994

[54] SWIVEL FITTING

[76] Inventor: Earle F. Chapman, P.O. Box 35, Douglas, Isle of Man, Isle of Man

[21] Appl. No.: 960,010

[22] Filed: Oct. 13, 1992

[51] Int. Cl.$^5$ ............................................. F16L 27/08
[52] U.S. Cl. ..................... 285/184; 285/185; 285/273; 285/334.2; 285/907
[58] Field of Search ................ 285/66, 70, 184, 185, 285/123, 272, 273, 274, 334.2, 907

[56] References Cited

U.S. PATENT DOCUMENTS

| | | | |
|---|---|---|---|
| 418,591 | 12/1889 | Roberts | 285/274 X |
| 1,217,041 | 2/1917 | Martz | 285/70 X |
| 2,458,967 | 1/1949 | Wiedenhoeft | 285/907 X |
| 2,825,586 | 3/1958 | Robboy | 285/907 X |
| 4,791,961 | 12/1988 | Nitzberg et al. | 285/272 X |

FOREIGN PATENT DOCUMENTS

| | | | |
|---|---|---|---|
| 1046421 | 12/1953 | France | 285/272 |
| 407667 | 9/1966 | Switzerland | 285/907 |

Primary Examiner—Randolph A. Reese
Assistant Examiner—Heather Chun
Attorney, Agent, or Firm—Malloy & Malloy

[57] ABSTRACT

An improved swivel fitting for interconnecting two tubular members which permits a range of relative swinging movement of the conduits relative to another, and wherein a cord or fiber optic length is adapted to be passed. It includes a housing composed of mating members, one of which is on the end of each conduit. In mated relation, a joint is defined between the conduit ends in which there is an internal annular path for the cord. The open ends of the conduits communicate with the path in the housing. The assembly is held in mated relation by a headed screw passed through a central, lateral, through hole in the housing members, and an ut is provided for threaded adjustment on the end of the headed screw. The central lateral through hole is sized to receive a hub structured with oppositely extending frustoconical portions and the hub has a through bore to receive the screw. The headed screw and nut are sized to apply a degree of force to compression washers which bear against the hub to selectively increase or decrease the friction between the housing members to select the degree of torque needed to swing the conduits relative to one another to permit or restrain swinging movement of angular adjustment of the conduits relative to one another while the cord is captivated within the internal path of the housing.

9 Claims, 2 Drawing Sheets

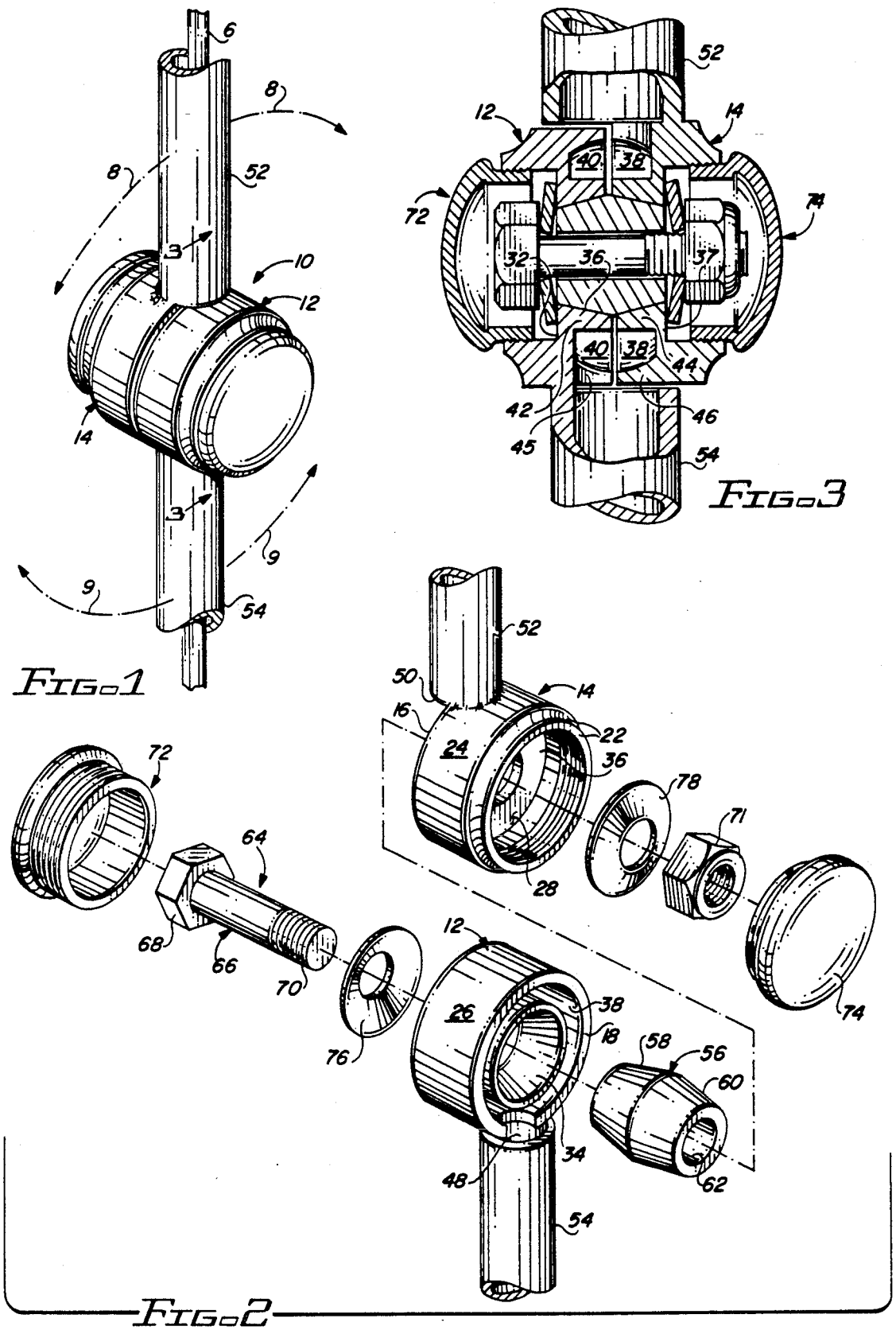

5,290,074

SWIVEL FITTING

BACKGROUND OF THE INVENTION

1. Field of the Invention

This invention relates to a swivel fitting for interconnecting the spaced confronting ends of two conduits through which a common cord extends and which fitting accommodates swinging relative movement of adjustment of the conduits about the swivel fitting. The fitting is structured with a friction control means to maintain the conduits in a selected adjusted position and yet permit swinging relative movement of the conduits for further adjustment when desired by a user.

2. Summary of the Invention

There has long been a problem of connecting two conduits together at a swivel joint which permits swinging movement of adjustment of the conduits while a common cord, such as an electrical cord, extends through the conduits and joint, and wherein the angularly adjusted tubular members will be normally maintained in the adjusted position yet the conduits may be swingable further for relative angular adjustment of the conduits upon the application of torque applied to the conduits. This invention is of such an improved swivel fitting, or multi-adjustable joint assembly, for joining the spaced confronting ends of tubular conduits and wherein the angular relationship of the conduits may be selectively adjusted and readjusted to various positions and maintained in a selected position.

Thus, this invention is of a multi-adjustable joint assembly with an internal circular through path which assembly is especially adapted for use in connecting together the confronting ends of two conduits and which assembly a) accommodates swinging movement of adjustment of one conduit relative to the other when an elongate common cord extends through the conduits and assembly, the cord being captivated in the internal through path of the assembly, and b) a selected adjusted angular position is maintained normally but that angular position may be further adjusted by torque applied to a conduit in an amount depending upon the degree of frictional force applied by a hub captivated within the assembly.

It is, accordingly, a general object of this invention to provide an improved multi-adjustable joint assembly for connecting together the confronting ends of two lengths of conduit through which a common cord extends and wherein the conduits may be angularly adjusted relative to one another through a range of movement of swing and be maintained in that position and that position may subsequently be adjusted further by applying torque to one of the conduits readjusting the angular relationship of the conduits, and that readjusted position will be maintained.

Another object of this invention is to provide an improved multi-adjustable joint assembly, or swivel fitting, of the type described more fully hereinafter which is relatively simple in construction, readily assembled, easily adjusted, and which is highly effective for the purpose of swinging movement of adjustment of two conduits with ends confronting one another such as might be used to accommodate an electrical cord or a fiber optic length.

BRIEF DESCRIPTION OF THE DRAWINGS

For a fuller understanding of the nature of the present invention, reference should be had to the following detailed description taken in connection with the accompanying drawings in which:

FIG. 1 is a partial perspective view of the adjustable joint assembly.

FIG. 2 is an exploded perspective view of the components of the adjustable joint assembly of FIG. 1.

FIG. 3 is a partial cross-section view taken on the plane indicated by the line 3—3 of FIG. 1 and looking in the direction of the arrows and comprising a full cutaway without threaded therethrough.

Like reference numerals refer to like parts throughout the several views of the drawings.

DESCRIPTION OF THE PREFERRED EMBODIMENT

Figure 4:
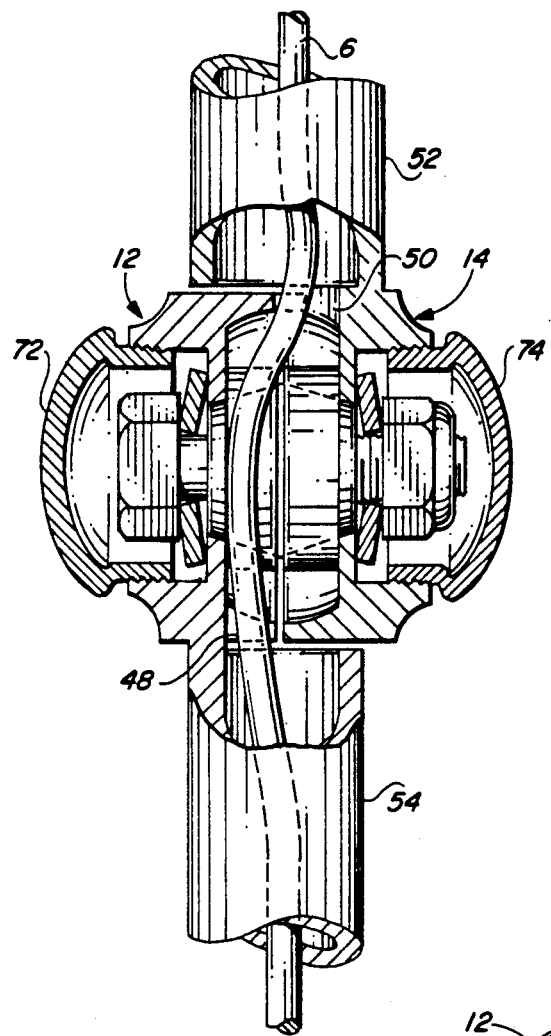
FIG. 4 is a partial cutaway view similar to that of Figure and illustrating a cord threaded therethrough to illustrate the cord path.

As best seen in FIG. 1, there is provided a multi-adjustable joint assembly 10 for connecting the confronting ends of two conduit lengths through which an electrical cord leading to a fixture may extend. A cord 6, in this case an electrical cord, is threaded or passed through the joint assembly and through oppositely disposed tubular portions 52 and 52 which are swingable relative to one another into and out of alignment as shown in FIG. 1 by movement of one or the other in the direction of the arrowed lines 8 and 9, the arrowed lines illustrating the direction of swing. The range of adjustment may be through about 180. The joint assembly is composed of portions seen in the exploded perspective view of FIG. 2. These include a first and second oppositely disposed mating housing member 12 and 14. Each of the housing members has a) an inner face 16, 18, which confront one another in assembly, b) an oppositely facing outer face 20, 22, and c) an outer annular surface 24 and 26 between the inner and outer faces. The inner faces in assembly, it is seen, are in close adjacent mating faying relation.

Figure 5:
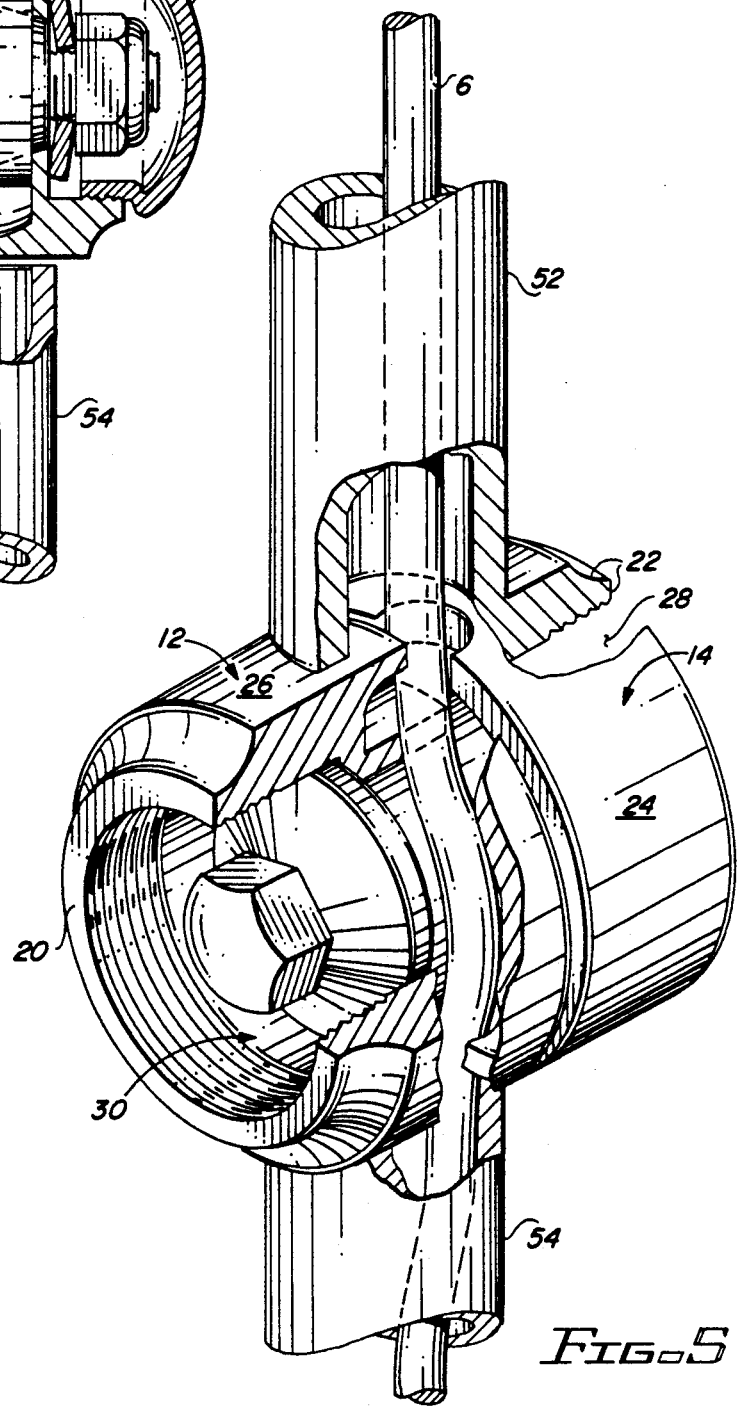
FIG. 5 is a perspective view of the adjustable joint assembly partially broken away and illustrating the cord path and with the end cap removed as seen in FIG. 4, for example.

The outer face of each member has a central recess, see 28 and 30, which extends toward the associated inner face; and the inner face of each member has a frustoconical central bore, see 32, 34, which is coaxial with the central recess and converges symmetrically from the inner face to the plane of juncture with the central recess. There is thus defined a recessed central surface or central shoulder, see 36 and 37 in the outer face of each housing member; and the inner faces of the housing members each define an enlarged mouth at the confronting housing member inner faces. The inner face of each housing member has an annular recess 38, 40 radially outwardly of the central bore. This defines an inner wall 42, 44 about the bore and an outer wall about the annular recess which, when the members are in assembly, comprises an annular cord passageway within the assembly which is best seen on reference to FIGS. 4 and 5. Each of the housing members has an opening in the outer wall into the passageway, see FIG. 4 at 48 and 50. These openings may be diametrically opposed to one another. From these openings, conduits or tubular portions 52 and 52 extend away from each member. A bearing or tubular hub 56, having a smooth outer surface composed of oppositely extending frustoconical zones 58 and 60, is provided. The hub has a through bore 62; and the hub is sized for and captivated in the frustoconical central bore of the members when in assembly. Fastener means, generally designed by the numeral 64, see FIG. 2, are provided to maintain the portions in assembly. The fastener means 64 includes a headed screw 66 sized for receipt in the through bore 62. The headed end 68 engages a washer 76 sized, configured and recessed to bear against the hub surface in the recess of the outer face of one of the housing members and a threaded nut on the opposite end which bears against a washer 78 sized, configured and recessed to bear against the surface in the recess in the outer face of the other mating housing member. In the illustrated embodiment, the washers 76 and 78 are flanged or frustoconically configured so that as the fastener means is tightened, the washers progressively bear against and apply compressive force to the outer faces of the members. The frustoconical or bevel characteristic of the washers conveys the required compressibility features. In the preferred embodiment, cap means 72 and 74 are threaded into the central recess of the outer face of each of the members or otherwise suitably maintained in covering and, indeed, decorative relation to the open recesses in the outer faces of the members.

It is thus seen that in use, a cord threaded through the assembly will be captivated yet the assembly can be adjusted by swinging movement of one or the other of the conduits and associated housing member as indicated in FIG. 1. It will be appreciated that the lower tubular portion 54 may comprise a short tubular member such as the base of a lampstand, and the upper tubular portion 52 may comprise an adjustable stem. It will be appreciated that the assembly has application for the containment of a cord threaded therethrough and provides for the directional positioning of one conduit relative to the other. It is therefore satisfactory for a fiber optic cord and is not necessarily limited to an electrical conductor. It is a useful positioning device for providing light upon a mirror, a bookholder, or for reading music.

In a preferred embodiment, the device may be of brass or other suitable metal components. The device can also be made of molded plastic components. As an alternative to the frustoconically configured washers 76, 78, an alternative version may utilize a compressible hub of plastic material of an axial length slightly greater than the axial length of the through bore so as to be compressible to expand and tightly fill the frustoconical bores so that as the fastener means is tightened, more friction is supplied to increase the degree of force necessary for relative movement of the tubular members and vice versa. In other words, one tubular member or conduit will remain in the same position relative to the other until swingably moved relative to the other when sufficient torque is applied in one direction or the other as indicated by the arrowed lines 8 or 9 in FIG. 1. Thus, friction is applied to maintain a desired angular adjustment of one conduit relative to the other yet the tubular portions are swingable relative to one another for subsequent adjustment. The amount of friction and hence the torque required to angularly adjust the conduits relative to one another is selected and determined by how tight the nut is on the screw because this applies forces on the hub which create the amount of friction which varies directly proportionally to the tightness.

In the embodiment of a hub of compressible material, the frustoconical washers 76, 78 would not be required because compression of a hub of this material would apply radially outwardly directed forces against the wall of the housing members depending upon the degree of tightening of the nut 71 relative to the head 68 of the screw 64. An additional drawing of a slightly larger hub 56 of compressible material has not been illustrated as it would unduly increase the number of drawings in this application and the length of the specification; however, the drawing of FIG. 2 illustrates this embodiment with washers which could then be eliminated if desired.

It is seen that the swivel fitting is adapted to be used on variously configured decorative table lamps, floor lamps, wall lamps, and on suspended overhead lighting, and there may be other potential applications.

The compact envelope character of the swivel fitting permits the internal passage of an electrical cord or other type elongate flexible cylindrical member from one side to the other while it extends through the opposing conduits with the potential for changing the alignment of those conduits within a variable arc of approximately 180°, though ordinarily limited to 90° or less in the course of usual application. Internal stop limits have not been provided in order to avoid complexity, but the same could be incorporated into a variation of the fitting design. The embodiment which features the concealed compression bolt which in conjunction with spring or frustoconically shaped washers, creates appropriate friction between the faying surface of the tapered central bushing or hub and the internal wall of the swivel housing as well as between the faying surfaces of opposing match faces of each side of the swivel fitting itself, which friction contact provides each component the ability to pass over the other in the movement described above. This feature eliminates the necessity for an external set screw or variable tension collar type fitting requiring two-handed adjustment to be used in order to create variations of the arm position and, hence, the light or other device carried by it. In the embodiment which would include a hub slightly longer than the hole within which it fits may utilize the commercial product known as "Delrin" of the E.I. DuPont de Nemours Co. of Wilimington, Delaware or equivalent compressible hub material. Additionally, the bevel compression washer, or frustoconically shaped washer, may be of Delrin or equivalent compressible material instead of a metal such as brass.

Finally, it will be appreciated that although in a preferred embodiment, the components are of metal, preferably brass, injection molded plastic components may be utilized for same if not all of the parts.

While this invention has been shown and described in several preferred embodiments, it is recognized that departures may be made within the spirit and scope of this invention which should, therefore, not be limited except as set forth in the claims which follow and within the doctrine of equivalents.

What is claimed is:
1. A multi-adjustable joint assembly comprising:
   a first and a second oppositely disposed mating housing member,
   each of said housing members having
      an inner face confronting the inner face of the other of said first and second members,
      an oppositely facing outer face, and
      an outer annular surface between said inner and outer faces, said inner faces, in assembly, being in close adjacent mating relation, said outer face of each member having a central recess extending toward said inner face, said central recess in the outer face of each member defining a recessed shoulder surface in the central recess in each housing member, said inner face of each member having a frusto-conical central bore coaxial with said central recess and converging from said inner face to said central recess, the diameter of said central bore at said outer face being less than the diameter of said central recess, an enlarged mouth at the inner face, said inner face having an annular recess radially outwardly of said central bore and coaxial therewith defining an inner wall about said bore and an outer wall about said annular recess and comprising an annular path between the inner and outer walls in each of the inner faces of the assembly, each of said housing members having an opening in the outer wall into the annular path to receive a flexible cylindrical member passed therethrough, a first and second tubular portion extending away from each member and said first tubular portion being in communication with the opening in the outer wall into the annular path of said first member, and said second tubular portion being in communication with the opening in the outer wall into the annular path of said second housing member, a tubular hub having a frustoconical first end zone with a distal end and a frustoconical opposite second end zone with a distal end, said hub having a through bore and said hub being sized for receipt in the central bore of the members when in assembly, adjustable fastener means including a portion extending through said bore of said hub, and means to apply a selected degree of frictional force between said hub and said assembly members when in captivating relation when a flexible cylindrical member is passed through the annular path so that the selected force will maintain the tubular portions in a selected angular adjustment of one relative to the other and the force may be relieved or tightened to permit adjustment of the force required to effect swinging movement of adjustment of the tubular portions relative to one another.

2. The assembly as set forth in claim 1 wherein the fastener means includes a) a screw in the bore of the hub, said screw having a headed end to confront the shoulder in the recess in the outer face of one of the members, said screw extending completely through said hub to a threaded terminal end zone in the central recess of the outer face of the other member beyond the shoulder of the other member, and b) a nut in the recess of the other member sized to confront the shoulder of the other member, and c) said means to apply selected force comprising a frustoconical washer in each recess converging outwardly and each bearing against the shoulder of one of the members and captivated between the screw on the one hand and the nut on the other hand and the adjacent housing member whereby the nut maybe threadably advanced or withdrawn to tighten or loosen the friction forces applied by the washers to the members.

3. The assembly as set forth in claim 2 wherein the washers are of metal.

4. The assembly as set forth in claim 2 wherein the washers are of deformable plastic material.

5. The assembly as set forth in claim 2 wherein the washers are of Delrin.

6. The assembly as set forth in claim 1 wherein cap means are provided to removably cover said central recess of each member.

7. The assembly as set forth in claim 1 wherein said means to apply a selected force comprises said hub being of compressible deformable plastic material sized and configured for receipt in the central recess of the members and being of an axial length longer than said central recess, each of said distal ends extending beyond the recessed shoulder surface in the outer face of each housing member.

8. The assembly as set forth in claim 1 wherein the flexible cylindrical member comprises an electrical cord.

9. The assembly as set forth in claim 1 wherein the flexible cylindrical member comprises a fiber optic length.

* * * * *